United States Patent
Dockser

(10) Patent No.: US 7,694,114 B2
(45) Date of Patent: Apr. 6, 2010

(54) SOFTWARE SELECTABLE ADJUSTMENT OF SIMD PARALLELISM

(75) Inventor: Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 940 days.

(21) Appl. No.: 11/150,501

(22) Filed: Jun. 9, 2005

(65) Prior Publication Data

US 2006/0282646 A1    Dec. 14, 2006

(51) Int. Cl.
*G06F 9/00* (2006.01)
*G06F 1/00* (2006.01)

(52) U.S. Cl. .................. 712/229; 713/320; 713/324

(58) Field of Classification Search .......... 712/229; 713/320–324
See application file for complete search history.

(56) References Cited

U.S. PATENT DOCUMENTS

| | | | |
|---|---|---|---|
| 2003/0037221 A1* | 2/2003 | Gschwind et al. | 712/3 |
| 2004/0034760 A1* | 2/2004 | Paver et al. | 712/221 |
| 2004/0254965 A1* | 12/2004 | Giernalczyk et al. | 708/160 |
| 2005/0149701 A1* | 7/2005 | Chen et al. | 712/221 |

OTHER PUBLICATIONS

Raman, S. K., Pentkovski, V., and Keshava, J. 2000. Implementing Streaming SIMD Extensions on the Pentium III Processor. IEEE Micro 20, 4 (Jul. 2000), 47-57.*

* cited by examiner

*Primary Examiner*—Eddie P Chan
*Assistant Examiner*—William B Partridge
(74) *Attorney, Agent, or Firm*—Nicholas J. Pauley; Sam Talpalatsky; Peter Kamarchik

(57) ABSTRACT

Selective power control of one or more processing elements matches a degree of parallelism to requirements of a task performed in a highly parallel programmable data processor. For example, when program operations require less than the full width of the data path, a software instruction of the program sets a mode of operation requiring a subset of the parallel processing capacity. At least one parallel processing element, that is not needed, can be shut down to conserve power. At a later time, when the added capacity is needed, execution of another software instruction sets the mode of operation to that of the wider data path, typically the full width, and the mode change reactivates the previously shut-down processing element.

10 Claims, 2 Drawing Sheets

SOFTWARE SELECTABLE ADJUSTMENT OF SIMD PARALLELISM

TECHNICAL FIELD

The present subject matter relates to techniques and equipment to selectively control active status (active and inactive) of one or a number of parallel data processing elements, e.g. of a Single Instruction, Multiple Data (SIMD) processor or the like based on software instructions, to conserve power for low power applications.

BACKGROUND

Many devices utilize integrated processors, such as microprocessors and digital signal processors, with complex arrangements of logic for performing data processing functions in accord with program instructions. Applications that require digital processing of multimedia data, such as video, audio or graphics, are becoming increasingly popular with consumers. Processing of such information, however, is intensive and has lead to processor architectures that are particularly suited to processing of such data.

Multimedia data typically includes a considerable amount of "parallel" data. Data is "parallel" where the individual units of data are not dependent on one another. Hence, processing of one unit of data is independent of processing of another unit, that is to say it need not wait for processing of any other unit to be completed. As a result, it is possible to perform a number of such independent data processing operations in parallel, at the same time. This feature of certain types of data, particularly the common forms of multimedia data, has led to the creation of parallel processors, which can simultaneously manipulate units of data in parallel. Parallel processing of multimedia data, for example, often helps to substantially increase overall processing speed.

A number of different architectures and instructions types have been developed for parallel data processing, particularly for multimedia applications. For example, Single Instruction, Multiple Data (SIMD) processors process data in parallel. Multimedia processing using SIMD instructions reduces the overall number of instructions required to execute a particular program task and speeds up performance by operating on multiple data elements in parallel. Although the processor executes a single stream of instructions, the SIMD execution of those instructions concurrently processes multiple data streams in parallel.

Many applications of processors, including highly parallel data processing type devices like SIMD processors, place severe constraints on power that the processor circuitry can consume. For example, portable devices, like cell phones, PDAs (portable digital assistants) and handheld video games, utilize battery power supplies. However, these devices include sophisticated microprocessors and in some cases use co-processors for multimedia related processing. Processor designs for such applications warrant careful control of power consumption, typically, to extend life of a charge in the battery power supply.

The architecture of a processor establishes a "width" of the data path through the processor, that is to say the maximum size of the data that can be processed. Parallel processing designs, such as SIMD processor architectures, are typically scaled to provide a data path width that corresponds to the maximum amount of parallel data that the device can process during a given cycle. Current SIMD processors are available that can process up to 128-bits of data at a time, which means that the overall width of the data path is 128-bits. However, at any given time, parallel portions of the processor may be processing smaller units of the data.

Although other sizes are known, common parallel processors today offer a 64-bit data path or a 128-bit wide data path. The data path is constructed of parallel processing elements, although the paths can be configured to handle data of different widths. A 128-bit data path, for example, can be broken up into small sizes, that is to say the processor can process sections of the 128-bit data that are 8-bits long, 16-bits long, 32-bits long or 64-bits long, as specified by the SIMD instructions written for the particular application. Using 8-bit instructions for example, a processor with a 128-bit wide data path can process sixteen 8-bit data units, in parallel. Conversely, with a 64-bit data path, if an instruction requires 128-bits, then the data may be divided into two 64-bit sections, and the instruction is sequentially executed on both 64-bit sections. The processing of each 64-bit section, of course may entail parallel processing, e.g. of eight 8-bit data units. By dividing the processing for the 128-bit instruction, the 64-bit wide data path can handle the 128-bit instruction, although the time for the divided processing is longer.

These operations allow optimum utilization of the parallel resources of the processor. Still, times occur when not all processing resources are needed for particular processing applications. Many functions or applications of the processor simply do not require the full processing capability of the processor device or require the full processing capability only for a very limited time. In the 128-bit data path processor example, an application or a portion thereof may require only 64-bit data processing, for some substantial period(s) of time, for example because there is a limited amount of data parallelism, the amount of data to process is low or there is not such a great need for speed. If the elements providing the 128-bit wide data path are all fully powered continuously, however, unused parallel elements are unnecessarily consuming power.

A parallel processor could be designed with a lower degree of parallelism than required for some applications, in order to be more efficient for applications that do not require the higher degree of parallelism. Although this compromise reduces power consumption for applications requiring less parallelism, it results in wasted power and poor performance when more parallelism is required.

Hence, low-power applications for parallel processors still create a need for a technique to selectively control power to a parallel element of a SIMD processor or the like, so as to effectively reduce power consumption.

SUMMARY

The teachings herein provide selective activation/deactivation of one or more elements of a programmable parallel data processor. A parallel processing element can be shut down, when not needed, to conserve power. Essentially, the power control matches the operative degree of parallelism to requirements of a task to be performed by the parallel data processor. Aspects of these teachings encompass various methods of operation as well as parallel processing devices.

For example, a method of controlling parallelism of operations of a parallel data processor, involves executing one or more instructions in parallel in two parallel processing elements, e.g. arithmetic logic units, of the data processor, so as to process data of a first width. Upon execution of a mode change instruction, one of the two parallel elements is deactivated to conserve power. While that element is inactive, one or more instructions are executed in a second one of the two parallel processing elements, so as to process data of a second width smaller than the first width.

In a 128-bit Single Instruction, Multiple Data (SIMD) type co-processor example, the parallel processing elements might be two 64-bit SIMD arithmetic logic units (ALUs). When both units are operational, the ALUs provide a 128-bit wide data path, and the co-processor operates in a 128-bit data processing mode. An instruction changes the mode to 64-bits, e.g. by setting a flag. In response, one of the ALUs is shut down, and the other ALU subsequently executes instructions for 64-bit wide data processing. Even in the 64-bit mode, however, the processor may handle instructions for processing of 128-bit data. For example, the methodology may further involve receiving a SIMD instruction calling for processing of 128-bit data and expanding that SIMD instruction to two instructions calling for processing of data of the 64-bit data width. The method then involves executing the two instructions resulting from the expansion in sequence through the one operational 64-bit ALU.

As noted, the present teachings also encompass parallel data processors adapted to control the degree of parallelism in response to appropriate instructions. An example of such a device comprises a first processing element responsive to program instructions, for processing data of a first width, e.g. 64-bits in one implementation. The data processor also includes a second processing element responsive to program instructions, connected to operate in parallel with the first processing unit. The parallel operation of the two processing elements provides parallel processing of data of a second broader width (e.g. 128-bits). The processor also includes control logic for selectively activating and deactivating the second processing element, in response to program instructions.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various techniques disclosed herein relate to selective power control of one or more parallel data processing elements, to match a degree of parallelism to requirements of a task performed in a highly parallel programmable data processor. As discussed in more detail below, when program operations require less than the full width of the data path, a software instruction of the program sets a mode of operation requiring a subset of the parallel processing capacity. At least one parallel processing element, that is not needed, can be shut down to conserve power. At a later time, when the added capacity is needed, execution of another software instruction sets the mode of operation to that of the wider data path, typically the full width, and the mode change reactivates the previously shut-down processing element.

Figure 1:
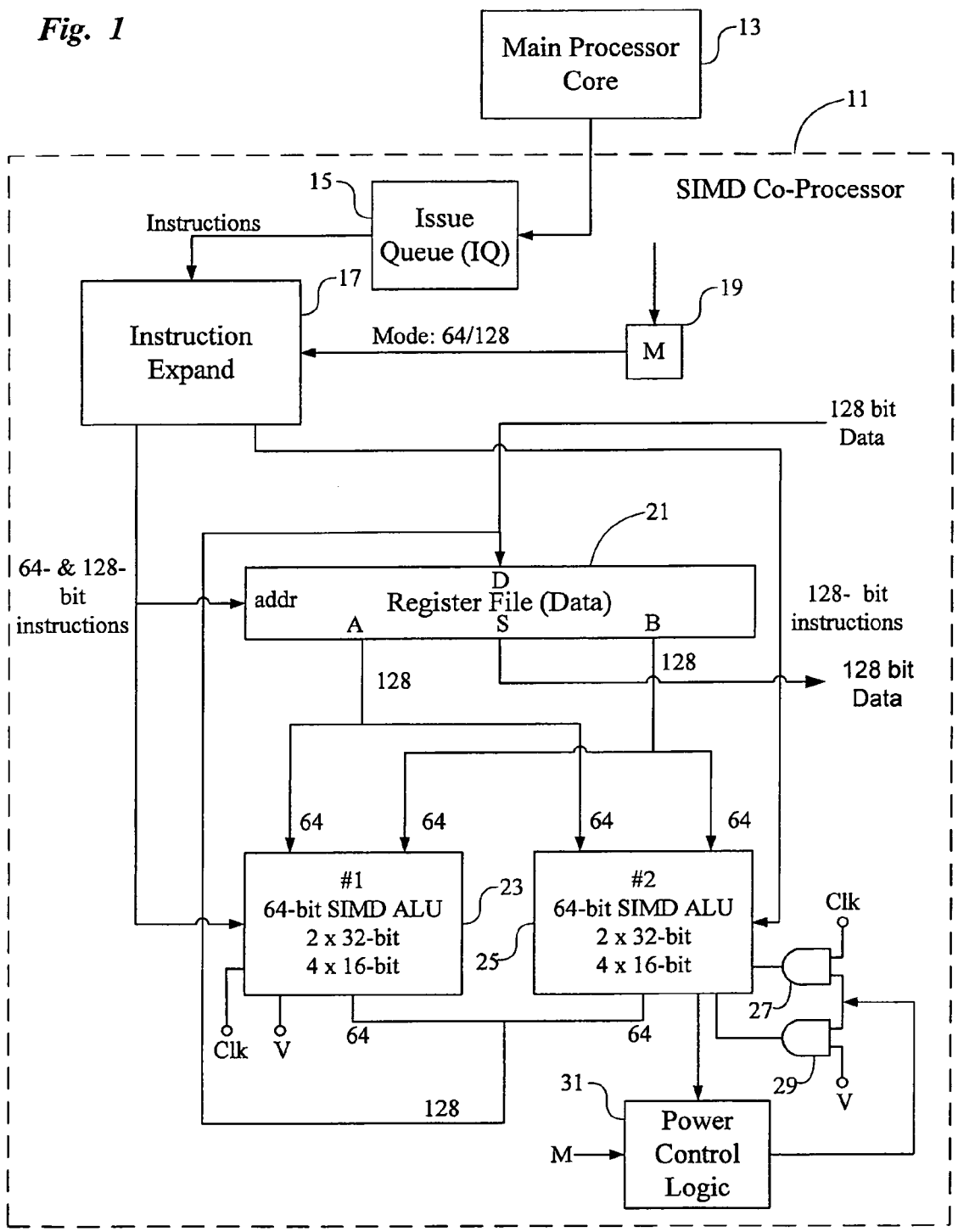
FIG. 1 is a functional block diagram, useful in understanding the selective power control of a parallel processing element, for example in a SIMD co-processor.

The present teachings are applicable to processor architectures having parallel data processing elements. Examples are discussed with respect to a SIMD-type parallel processor architecture. Reference now is made in detail to the examples illustrated in the accompanying drawings and discussed below. As noted, SIMD designs currently available in the market provide 64-bit and 128-bit wide data paths. However, the present teachings are applicable to parallel processors having narrower or wider data paths. The functional block diagram of FIG. 1 illustrates components of a SIMD device that are useful in explaining the parallel element power control. Those skilled in the art will recognize that other elements would be included in an actual SIMD processor. In the example, the parallel processing device is implemented as a SIMD co-processor 11, e.g. for performing multimedia data processing operations under control of an associated main core processor 13.

Although not shown, a control may be provided to shut down the entire co-processor 11 when not being used by the application running in the main processor core 13, e.g. when there is no need for multimedia processing. Discussion here will focus instead on cases where at least some processing through the SIMD device 11 is called for, although different operating modes will utilize different levels of the parallel processing capabilities of the device 11.

In operation, the main processor core 13 will run one or more programs, which will call for multimedia processing of at least some data. The instruction set executed will include a SIMD extension, that is to say, a number of the instructions will be SIMD type processing instructions. The main processor core 13 issues these SIMD instructions to the co-processor 11, where they are initially placed in issue queue (IQ) 15. The issue queue is essentially a first-in-first out buffer device for storing a number of SIMD instructions in sequence, before execution.

The IQ stage 15 supplies instructions, in sequence, to an instruction expand stage 17. The SIMD co-processor 11 can provide parallel processing in a number of different data width modes. Although there may be more modes or variations in the data widths supported in each mode, the example shows a configuration of the co-processor 11 supporting 64-bit operation and 128-bit operation.

A flag bit (M) 19 indicates the current operating mode. The bit value may be held in a flip-flop or as a bit in a larger register, e.g. in a condition register. A typical example of the processor 11 will include a 32-bit control register (not separately shown), and the mode flag 19 may be one bit at a designated position in that register. As discussed more later, the flag 19 is set in response to execution of a software instruction. The expand stage 17 is responsive to the state of the mode flag 19.

The SIMD co-processor also includes a register file 21, for holding operand data prior to processing, and an execution stage. In this simple example, the execution stage consists of two SIMD type arithmetic logic units (ALU) 23, 25. In the 128-bit mode, both ALUs 23 and 25 are active, whereas in the 64-bit mode, only the first (#1) ALU 23 is active.

In the 64-bit mode, the co-processor 11 can still handle a 128-bit SIMD instruction. For that purpose, the stage 17 'expands' the 128-bit instruction by breaking it into two instructions each structured for processing of 64-bits of data. In the 64-bit mode, the stage 17 dispatches all instructions to the ALU 23, including instructions that originally called for 64-bit wide data processing, as well as pairs of 64-bit instructions derived from expansion of any 128-bit instructions in the stream of SIMD instructions from the IQ stage 15. In the 128-bit mode, the stage 17 dispatches instructions to both the first and second ALUs 23, 25, so that the units 23 and 25 operate in parallel to provide a 128-bit wide SIMD data processing path.

Although the processor 11 executes a single stream of instructions, the SIMD execution of those instructions concurrently processes multiple pieces of data in parallel. Each ALU 23 or 25, for example can concurrently operate on two 32-bit data words or on four 16-bit data words. When both units 23 and 25 are operating in parallel, the combined data processing capability can handle four 32-bit data words or eight 16-bit data words. Other combinations of parallel processing are also possible.

In a simple example, the register file 21 may comprise two 128-bit wide registers for data, although additional registers may be provided. Those skilled in the art will understand that the register file could comprise additional registers, for example, sixteen registers, each 128-bits wide. Control of the register file 21 splits each 128-bits of data and sends appropriate amounts to each of the ALUs 23 and 25. The D port of the file 21 is a write port. Via the port D, data that is 128-bits wide may be written to a register in the file 21, e.g. from a source (not shown) or from the results output by the ALUs. The S port of the file 21 is a read port. Via the port S, data that is 128-bits wide may be read from a register in the file 21, e.g. to a sink (not shown) such as memory. The A and B ports of the register file 21 are read ports, for supplying split data (64-bits each) to the ALUs 23 and 25.

For 128-bit data processing instructions, the register file 21 supplies the low (least significant) half of the 128-bits of data to the second ALU 25 and sends the high (most significant) half of the data to the first ALU 23. For a 64-bit instruction, the processor can select either the low half or the high half of the 128-bits of data in the register file to supply to the first ALU 23. In the 128-bit mode, any 64-bit instructions go to the first (#1) SIMD ALU 23, and 128-bit instructions go to both SIMD ALUs 23 and 25. In the 64-bit mode, all 64-bit instructions go to the first SIMD ALU 23. Any 128-bit instructions are converted into two 64-bit instructions, which are fed sequentially to the first SIMD ALU 23.

As noted above, execution of an instruction will set the bit for the mode flag 19, to indicate whether the co-processor 11 should operate in the 64-bit mode or not. Essentially, the program is written to set the mode of operation at appropriate points in the processing flow. The mode setting instructions may be written-in by the programmer, or a compiler may insert the mode setting instructions when the program is compiled into machine language code. The co-processor may be designed to set the flag 19 in response to mode instructions executed by one or both of the ALUs 23, 25, in which case the instructions are written in such a form that the core 13 issues those instructions to the co-processor 11 for execution. Alternatively, the processor 11 could be coupled to the main processor core 13, so that the core 13 sets the flag 19, in response to mode instructions executed by the main processor core 13. It is also possible that either processor 11 or 13 may set the mode flag 19.

The mode status indicated by the flag 19 controls selective operations of the dispatch and expansion functions of the stage 17. For example, the processor could be configured to process all instructions in the form of 64-bit instructions, so long as the bit of flag 19 is a 1. If occasionally the stream of SIMD instructions includes a 128-bit instruction, the instruction expand stage 17 processor will break it down into two 64-bit instructions and send them through seriatim, to the ALU 23. When the bit of flag 19 is a 0, the stage 17 switches to the 128-bit mode, in which it directs instructions for 128-bit wide operations to both ALUs 23 and 25 without expansion. In this mode, if there is an occasional 64-bit instruction in the stream from the main processor 13, the stage 17 can dispatch the 64-bit instruction to the first ALU 23.

The mode status of the processor 11 indicated by the flag 19 also controls selective activation and deactivation of at least one parallel processing element, in the example, the second ALU 25. The ALU 25 is active in the 128-bit mode, whereas it is unneeded in the 64-bit mode. In accord with the present teachings, the ALU 25 is powered in the 128-bit mode, whereas it is powered-down (deactivated) in the 64-bit mode.

As noted above, a 1 bit in the mode flag 19 indicates 64-bit operation. When the flag changes to that state (from a 0), the ALU 25 can be powered down. Conversely, when the bit of flag 19 goes back to a 0, the processor switches back to the 128-bit mode, and the processor will power-up the other half of the processor logic, in this case the second ALU 25.

Operational status of the controlled parallel processing element, that is to say the second ALU (#2) 25 in the example of FIG. 1, may be controlled via one or more gate or switch circuits, represented generically by logic gates 27 and 29. Such a gate or switch selectively supplies and withdraws an enabling signal needed by the particular element. The gates 27 and 29 appear as AND gates in the drawing, but they are intended as generic representations of circuits for selectively coupling signals to the elements of the ALU 25. Such a circuit 27 or 29 may be a logic gate of any type, a switch, a combination thereof, or any other circuit configured to supply the appropriate type of signal to the functional elements of the ALU 25 in response to appropriate selection signals from power control logic 31.

In this way, the power control logic 31 controls the active status of the second ALU (#2) 25, in the example of FIG. 1. The mode flag itself could provide direct control of the selective activation and deactivation of gate(s) 27, 29 and thus of the ALU 25. However, in such a case the ALU would power up and power down immediately upon each transition of the mode of operation as indicated by changes of state of the mode flag 19. In most implementations, the ALUs 23 and 25 will comprise multi-stage pipeline units, and there may be a number of instructions in-flight in the ALU 25 when the flag 19 changes. The power control logic is responsive to the mode flag 19, but it can provide a time lag following a state change, to allow for a smooth processing transition. For example, the logic 31 can monitor the operations of the ALU 25, so that upon detection of a transition to a 1 bit (shift from 128-bit mode to 64-bit mode), the power control logic 31 will delay deactivating the ALU 25, until any remaining in-flight 128-bit instructions have been processed and passed out of that ALU. Although not shown, the logic 31 may also provide signals to other elements of the processor to control initial application of 128-bit instructions after a transition to the 128-bit mode, e.g. to allow for time needed to power-up the ALU 25.

The power control logic 31 may be implemented to selectively control the status of the second ALU (#2) 25 in any of a variety of known ways, by selectively enabling and disabling any signal needed for operation of the unit via operation of an appropriate gate or switch circuit 27 or 29. For example, the ALU 25 can be selectively enabled and disabled by controlled gating of the clock signal (CLK) used to control circuit switching functions within to the unit 25. The ALU 25 is disabled, in such an implementation, by cutting off the flow of the clock signal (CLK) through the gate 27 to the ALU 25, so that the circuitry of the unit 25 does not switch at all in response to clock signals. This reduces dynamic power consumption. To reduce leakage in such an implementation, the transistors of the ALU 25 may be designed with relatively high gate threshold voltages (low leakage when not switching). Control based only on gating of the clock signal, however, may allow for relatively quick re-starts of the ALU.

Alternatively or in addition (as shown), the ALU state may be controlled by selective application or withdrawal of a connection to a terminal of the power supply. Although the affected connection could be that to ground or a negative supply voltage, for purposes of the example, the gate 29 controls supply of voltage V to the second (#2) SIMD ALU 25. Operation of the gate 29 by the power control logic 31 turns power to the ALU 25 on and off in accord with the current mode of operation of the co-processor 11. In such an implementation, when the mode flag shifts to 1 (64-bit operation), the power control logic 31 disables the ALU 25 after any remaining 128-bit instructions have been processed. At that time, the control logic 31 triggers the gate 29 to cut off a connection to the power terminal for supply voltage V, with respect to the circuitry of the ALU 25. This type of cut-off eliminates dynamic power consumption and leakage through the circuitry of that unit.

The first (#1) SIMD ALU 23 is active in both modes. Hence, that ALU is shown connected directly to the clock signal (Clk) and supply voltage (V), without gated control. However, power and/or clock signal to that processing element 23 also may be controlled, e.g. to permit shutdown thereof when the co-processor 11 is not needed.

The example of FIG. 1 shows a single parallel processing element, ALU 25, controlled based on the active mode of operation. Those skilled in the art will recognize that a given processor may include several similar controls for a number of parallel elements that may be inactive while the processor 11 operates on narrower data for considerable periods of time. Assuming a 128-bit maximum width, for another example, the first ALU might be implemented as two 32-bit ALUs. In that case, an additional control system similar to 27, 29 and 31 could control the second 32-bit ALU to provide additional selective deactivation of one 32-bit SIMD ALU, leaving only one unit active for 32-bit only operation.

Figure 2:
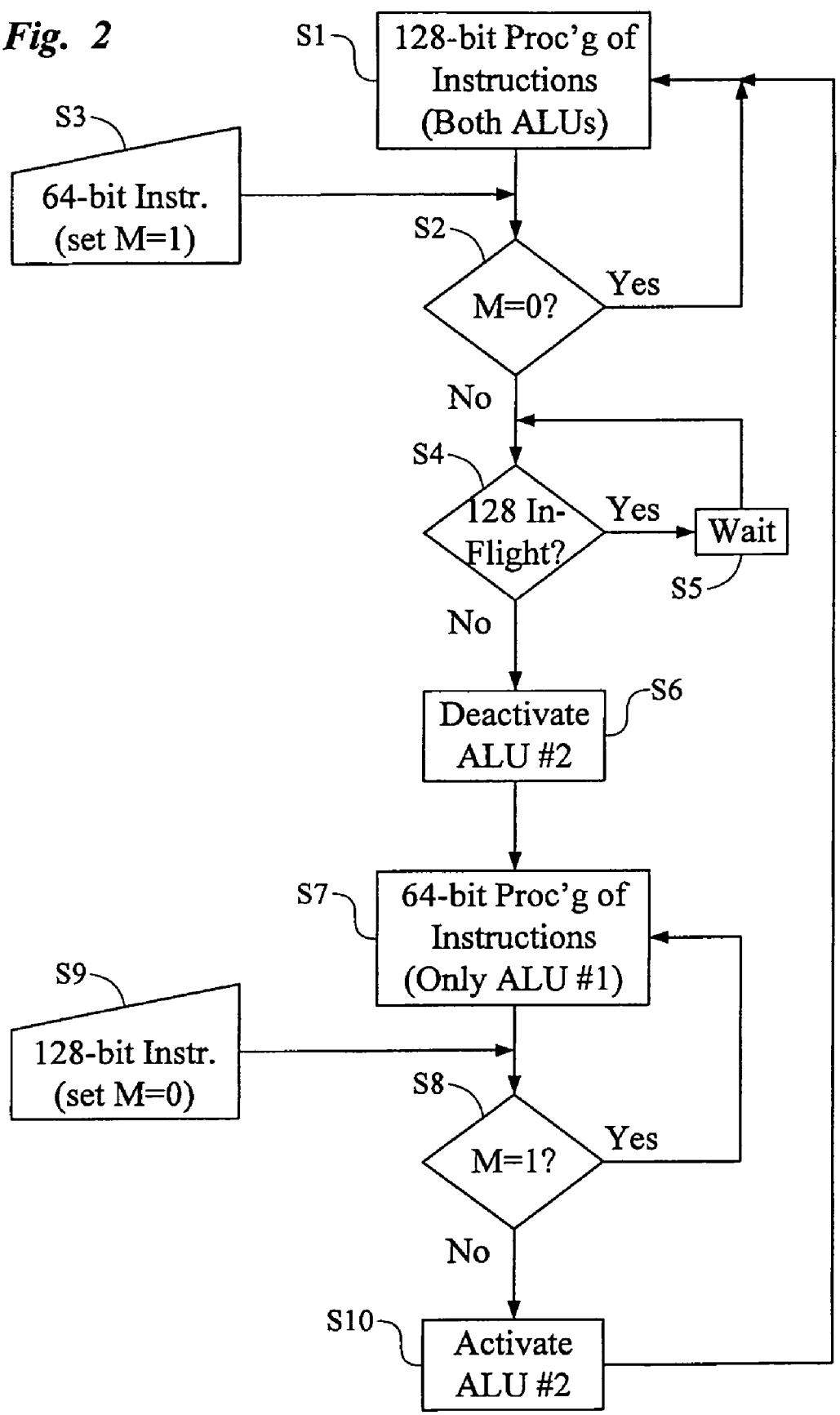
FIG. 2 is a simplified flow chart useful in understanding an example of control operations involved in switching between two different levels of parallelism in the co-processor.

FIG. 2 is a flow chart showing a possible flow of the execution involved in switching between two different levels of parallelism in the processor 11 of FIG. 1. For purposes of discussion, assume that initially (at S1) the processor is executing instructions in parallel in the two parallel arithmetic logic units 23 and 25. In this mode, the data processed may be up to 128 bits wide, that is to say as wide as the full data path provided by the units 23 and 25 working together. In this mode, the power control logic 31 will periodically check the status of the mode flag 19. For example, at step S2 if M=0 (M≠1), then processing flows back to S1, so that the processor 11 continues in the 128-bit mode of operation.

At some point, the main processor core 13 or the co-processor 11 will execute an instruction that changes the state of the mode flag 19 to a 1 (step S3). When next the flow of operation of the power control logic 31 checks the flag at S2, processing now flows to S4. At S4, the logic 31 checks the second arithmetic logic unit (ALU #2) 25 to determine if there are any remaining in-flight 128-bit instructions that need to be processed and passed out of that arithmetic logic unit 25. If so, the logic waits (S5) and checks again. This monitoring continues until there are no longer any remaining in-flight 128-bit instructions to be processed by the second arithmetic logic unit (ALU #2) 25, at which point processing flows to step S6.

In the example, the processing reaches S6 upon detection of a mode change instruction, and detection that there are no in-flight 128-bit instructions remaining to be processed the second arithmetic logic unit (ALU #2) 25. Hence, in step S6, the power control logic 31 deactivates or shuts down that unit 25, to conserve power. Further processing runs in the 64-bit mode (S7), as discussed above. For example, while the second arithmetic logic unit 25 is inactive, the processor 11 executes one or more instructions in the first arithmetic logic unit 23, so as to process data of 64-bits. Any 128-bit instructions received in this mode are expanded and processed sequentially as two 64-bit instructions.

While in this mode, the power control logic 31 periodically checks the status of the mode flag 19. For example, at step S8, if M=1 (M≠0), then processing flows back to S7, so that the processor 11 continues in the 64-bit mode of operation. At some point, the main processor core 13 or the co-processor 11 will execute an instruction that changes the state of the mode flag 19 back to a 0 (step S9). When next the flow of operation of the power control logic 31 checks the flag at S8, processing now branches to step S10. In step S10, the control logic 31 activates the second arithmetic logic unit (ALU #2) 25, and processing returns to step S1 where further operations utilize the 128-bit instruction mode.

The present teachings have a wide range of applications. For example, the power control may be implemented in other parallel processors and in processors having different data path widths. Also, the example of the parallel processor discussed above provided a co-processor associated with a main processor core. Those skilled in the art will understand, however, that the parallelism control techniques discussed herein are not limited to co-processor implementations.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of processing a Single Instruction, Multiple Data (SIMD) instruction when the SIMD instruction requires a data path width greater than an active data path width in a parallel data processor, comprising:

executing one or more instructions in parallel in at least two parallel arithmetic logic units of the data processor, so as to process data of a first width, said at least two parallel arithmetic logic units are SIMD type arithmetic logic units;

upon execution of a mode change instruction, powering down a first one of the two parallel arithmetic logic units to conserve power; and while the first arithmetic logic unit is inactive, executing one or more instructions in a second one of the two parallel arithmetic logic units, so as to process data of a second width smaller than the first width;

receiving a SIMD instruction calling for processing of data of the first width;

expanding the SIMD instruction in response to the received SIMD instruction calling for processing of data of the first width to at least two instructions calling for processing of data of the second width; and executing the two instructions resulting from the expansion in sequence through the second arithmetic logic unit.

2. A parallel data processor, comprising:

a first arithmetic logic unit having a first data path width;

a second arithmetic logic unit connected to operate in parallel with the first arithmetic logic unit, the parallel operation of the first and second arithmetic logic units providing a second data path width greater than the first data path width, said first and second arithmetic logic units being Single Instruction, Multiple Data (SIMD) type arithmetic logic units;

means for activating the second arithmetic logic unit in response to an instruction calling for processing of data of the second width and for deactivating the second arithmetic logic unit in response to an instruction calling for processing of data of the first width; and an instruction expansion stage configured to convert an instruction calling for processing of data of the second width when the second arithmetic logic unit has been deactivated to a plurality of instructions calling for processing of data of the first width and configured to supply the expanded plurality of instructions sequentially to the first arithmetic logic unit for execution.

3. The processor of claim 2, wherein each of the arithmetic logic units provides 64-bit wide data processing.

4. A parallel data processor, comprising:

a first processing element responsive to program instructions, for processing data of a first width;

a second processing element responsive to program instructions, connected to operate in parallel with the first processing unit, the parallel operation of the first and second processing elements providing parallel processing of data of a second width greater than the first width, wherein said first and second processing elements are configured to process data in response to Single Instruction, Multiple Data (SIMD) type instructions;

control logic for selectively activating and deactivating the second processing element in response to setting of a mode by program instructions calling for processing of data of the second width and calling for processing of data of the first width, respectively; and an instruction expansion stage configured to convert a SIMD instruction calling for processing of data of the second width to a plurality of SIMD instructions calling for processing of data of the first width and configured to supply the expanded plurality of SIMD instructions sequentially to the first processing element for execution, when the second processing element has been deactivated.

5. A method of supporting a SIMD instruction in a parallel data processor when the width of a data path required by the SIMD instruction is greater than the width of an active data path, comprising:

deactivating a first portion of a data path resulting in a second portion of the data path being active;

receiving a SIMD instruction requiring a data path width greater than the width of the second portion of the data path;

expanding the SIMD instruction in to two or more instructions in response to the received SIMD instruction requiring a data path width greater than the width of the second portion of the data path, wherein each expanded instruction requires at most the width of the second portion of the data path; and serially processing the two or more expanded instructions utilizing the second portion of the data path.

6. The method of claim 5 wherein the first data path provides input to a first arithmetic logic unit and the second data path provides input to a second arithmetic logic units.

7. The method of claim 6 wherein the deactivating of the first portion of the date path further comprises:

setting a current operating mode in response to an instruction; and powering down the first arithmetic logic unit.

8. The method of claim 7 wherein the expanding the SIMD instruction into two or more instructions is also in response to the current operating mode.

9. The method of claim 6 wherein the width of the first portion of the data path is 64 bits and the width of the second data path is 64 bits.

10. The method of claim 6 wherein serially processing the two or more expanding instructions further comprises:

processing the two or more expanded instructions in the second arithmetic logic unit.

* * * * *

UNITED STATES PATENT AND TRADEMARK OFFICE
CERTIFICATE OF CORRECTION

| | | |
|---|---|---|
| PATENT NO. | : 7,694,114 B2 | Page 1 of 1 |
| APPLICATION NO. | : 11/150501 | |
| DATED | : April 6, 2010 | |
| INVENTOR(S) | : Dockser | |

It is certified that error appears in the above-identified patent and that said Letters Patent is hereby corrected as shown below:

Column 10, line 30, claim 6: "logic units" to read as --logic unit--

Signed and Sealed this
Twelfth Day of July, 2011

David J. Kappos
*Director of the United States Patent and Trademark Office*